US008677284B2

(12) United States Patent
Aguilar

(10) Patent No.: US 8,677,284 B2
(45) Date of Patent: Mar. 18, 2014

(54) METHOD AND APPARATUS FOR CONTROLLING AND DISPLAYING CONTENTS IN A USER INTERFACE

(75) Inventor: Antonio Aguilar, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 624 days.

(21) Appl. No.: 12/612,038

(22) Filed: Nov. 4, 2009

(65) Prior Publication Data

US 2011/0107272 A1    May 5, 2011

(51) Int. Cl.
*G06F 3/048* (2013.01)
*G06F 3/033* (2013.01)

(52) U.S. Cl.
USPC .................................. 715/863; 715/830

(58) Field of Classification Search
USPC ......... 715/810, 828–831, 840, 849, 852–853, 715/863
See application file for complete search history.

(56) References Cited

U.S. PATENT DOCUMENTS

| 6,539,289 | B2 * | 3/2003 | Ogino et al. ....................... 701/1 |
| 6,610,936 | B2 | 8/2003 | Gillespie et al. |
| 6,636,246 | B1 | 10/2003 | Gallo et al. |
| 6,710,788 | B1 | 3/2004 | Freach et al. |
| 6,874,128 | B1 | 3/2005 | Moore et al. |
| 6,880,132 | B2 * | 4/2005 | Uemura ....................... 715/848 |
| 6,938,218 | B1 | 8/2005 | Rosen |
| 7,239,947 | B2 | 7/2007 | Suzuki |
| 7,543,245 | B2 * | 6/2009 | Irimajiri ....................... 715/836 |
| 7,705,833 | B2 * | 4/2010 | Kim ................. 345/173 |
| 7,773,075 | B2 * | 8/2010 | Otsuka et al. ................. 345/173 |
| 8,375,295 | B2 * | 2/2013 | Zalewski et al. ............... 715/234 |
| 2006/0020903 | A1 | 1/2006 | Wang et al. |
| 2006/0025920 | A1 | 2/2006 | Nezu et al. |
| 2006/0066507 | A1 | 3/2006 | Yanagisawa |
| 2007/0150842 | A1 * | 6/2007 | Chaudhri et al. ............. 715/863 |
| 2007/0222769 | A1 | 9/2007 | Otsuka et al. |
| 2008/0129684 | A1 | 6/2008 | Adams et al. |
| 2010/0005418 | A1 * | 1/2010 | Miyazaki et al. ............. 715/823 |
| 2010/0081475 | A1 * | 4/2010 | Chiang et al. ................. 455/564 |
| 2010/0309148 | A1 * | 12/2010 | Fleizach et al. ............... 345/173 |

FOREIGN PATENT DOCUMENTS

| EP | 1648149 A1 * | 4/2006 |
| JP | 2006084919 | 3/2006 |

OTHER PUBLICATIONS

Ni et al., "Tech-note: rapMenu: Remote Menu Selection Using Free-hand Gestural Input", IEEE Symposium on 3D User Interface, Mar. 8-9, 2008, Reno, Nevada, USA, copyright 2008 IEEE, pp. 55-58—pertains to using rotational gestures to search and select objects in a 3D menu.*

* cited by examiner

*Primary Examiner* — Omar Abdul-Ali
*Assistant Examiner* — Andrew Tank
(74) *Attorney, Agent, or Firm* — Muramatsu & Associates

(57) ABSTRACT

A user interface with multiple applications which can be operated concurrently and/or independently by using simple finger gestures allows a user to intuitively operate and control digital information, functions, applications, etc. to improve operability. The user is able to use finger gesture to navigate the user interface via a virtual spindle metaphor to select different applications. The user can also split the user interface to at least two display segments which may contain different applications. Moreover, each display segment can be moved to a desirable location on the user interface to provide a seamless operation environment.

19 Claims, 17 Drawing Sheets

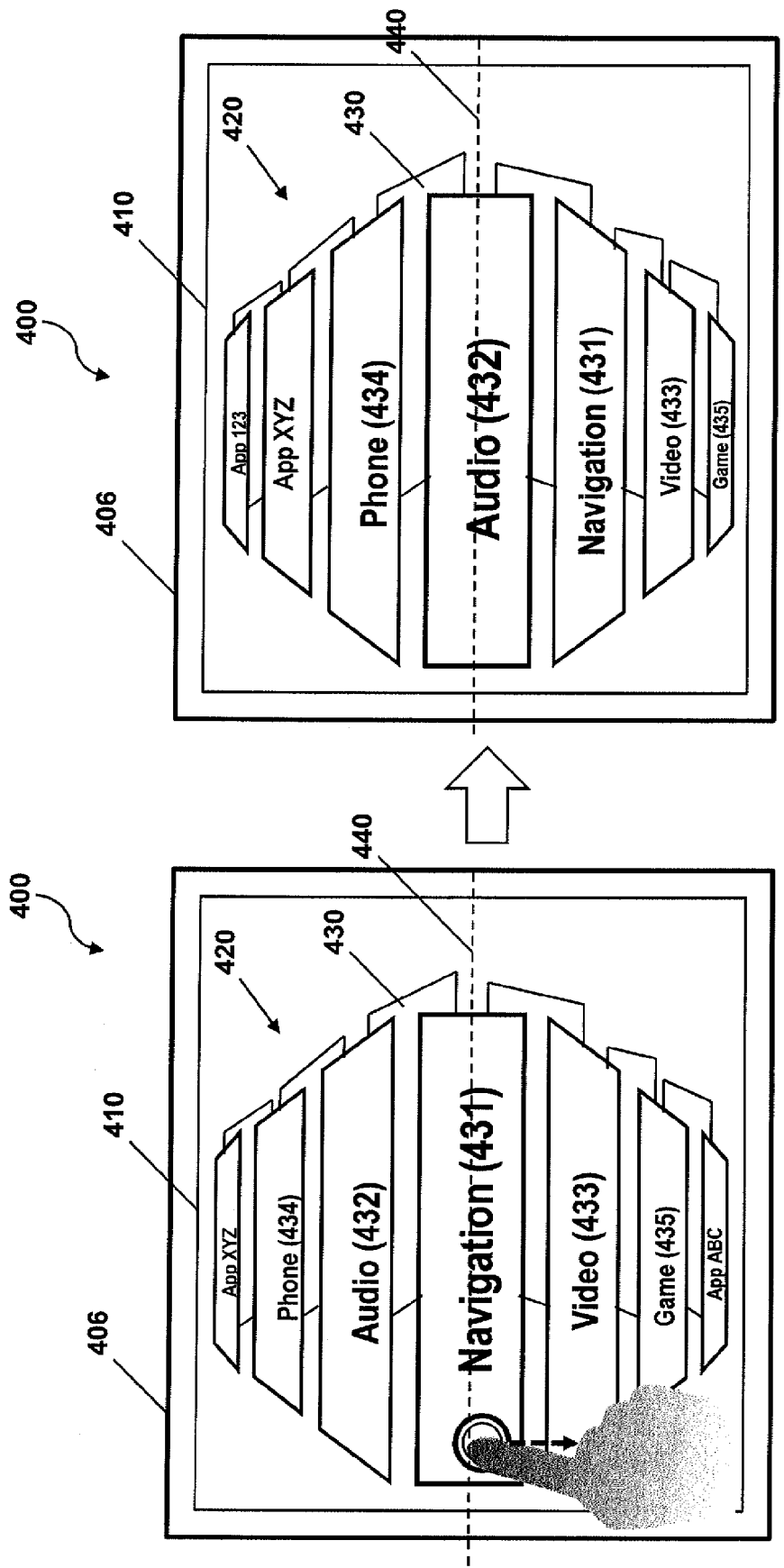

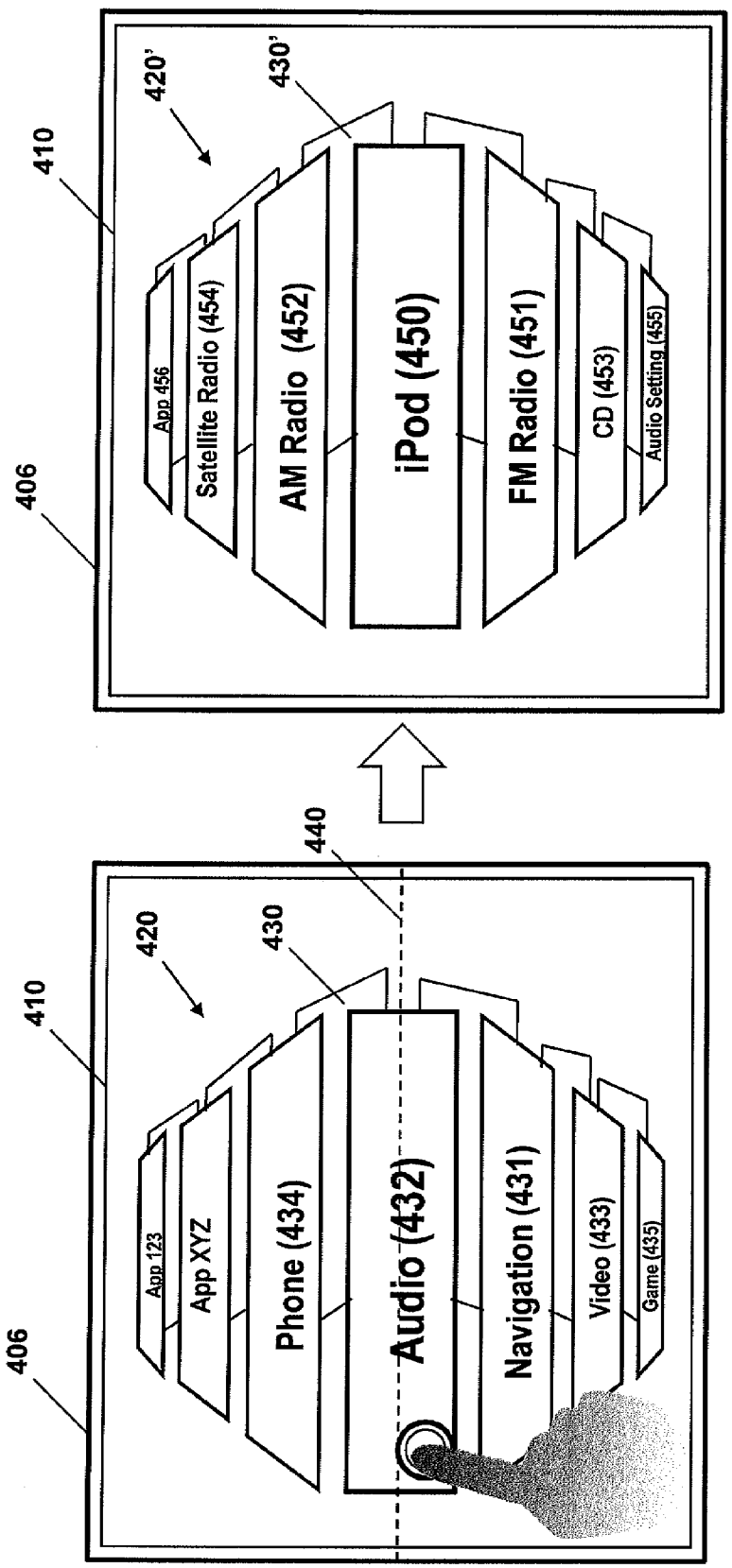

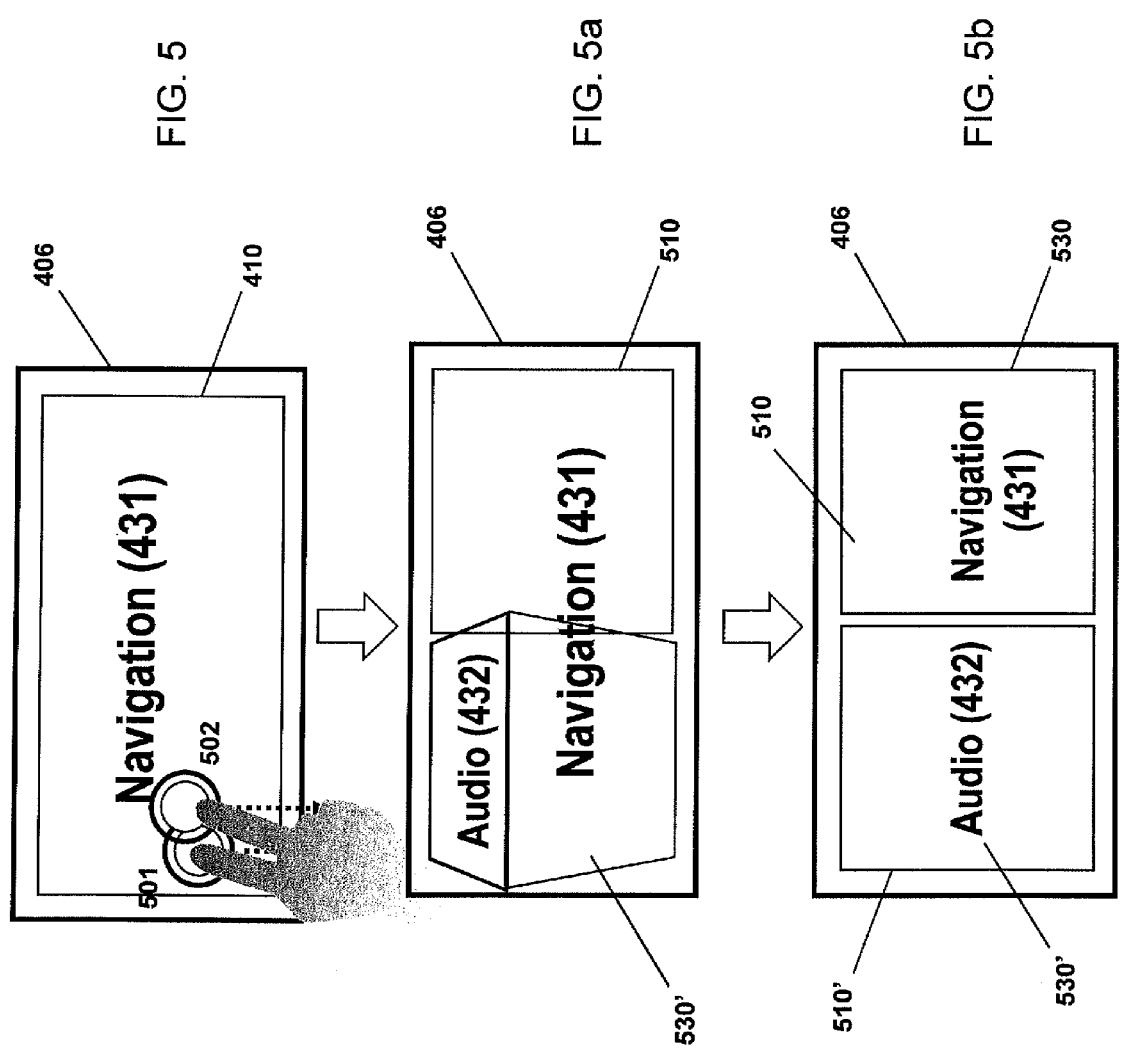

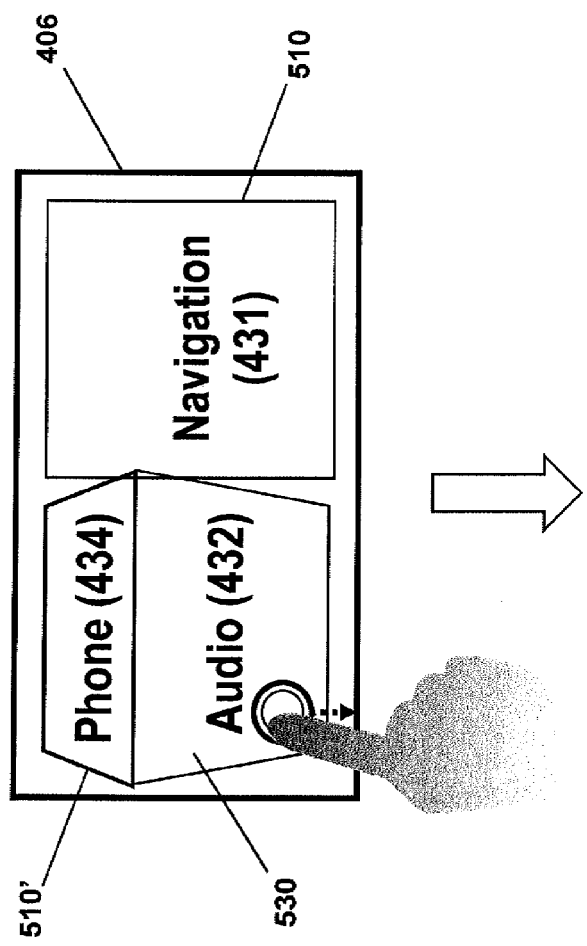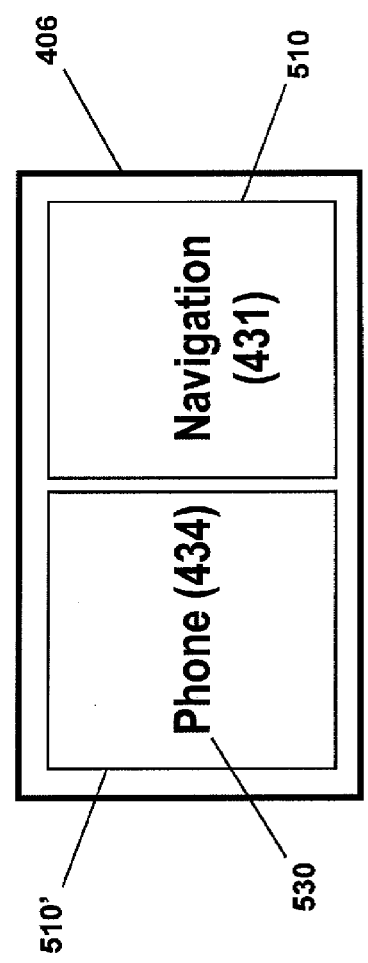

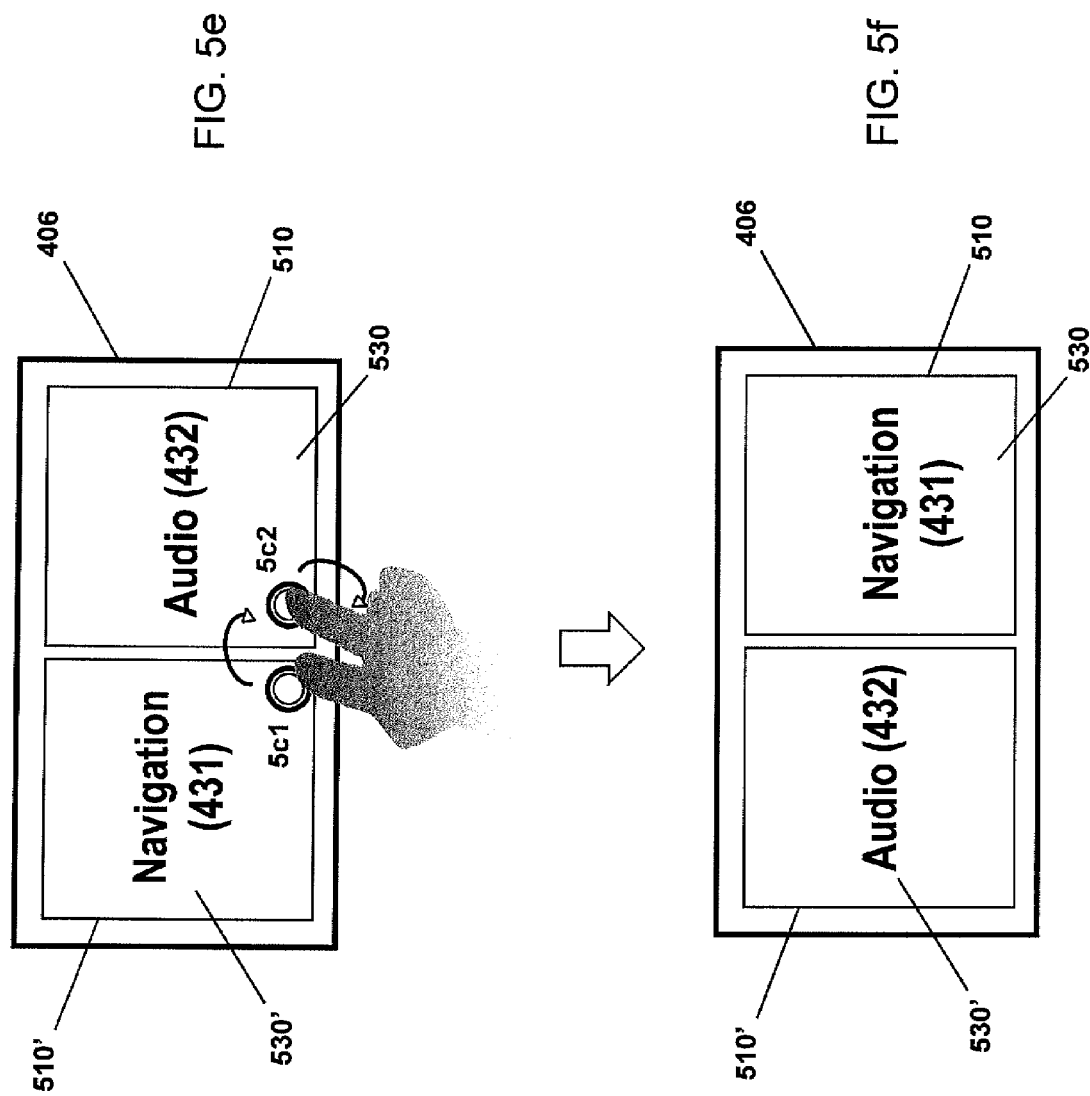

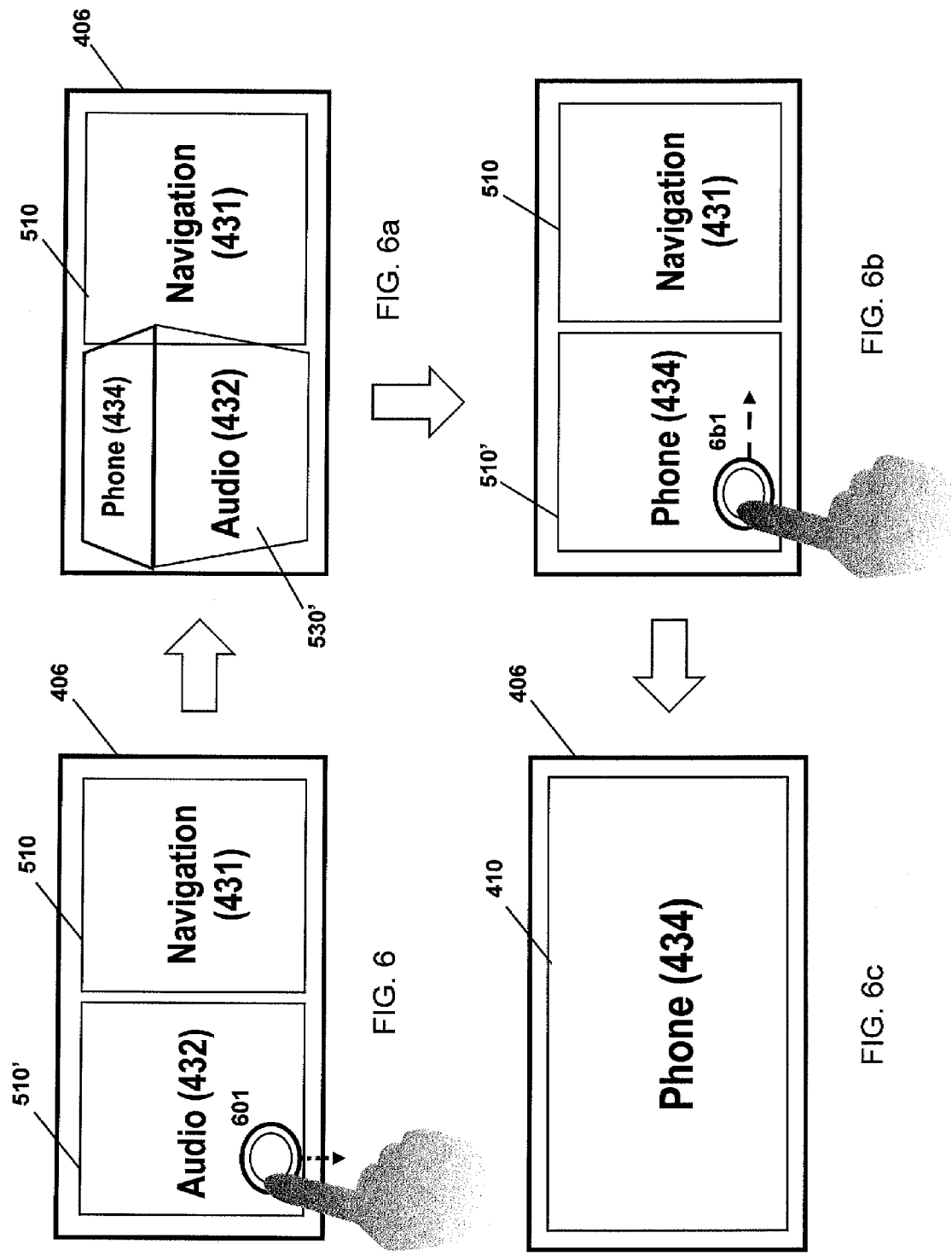

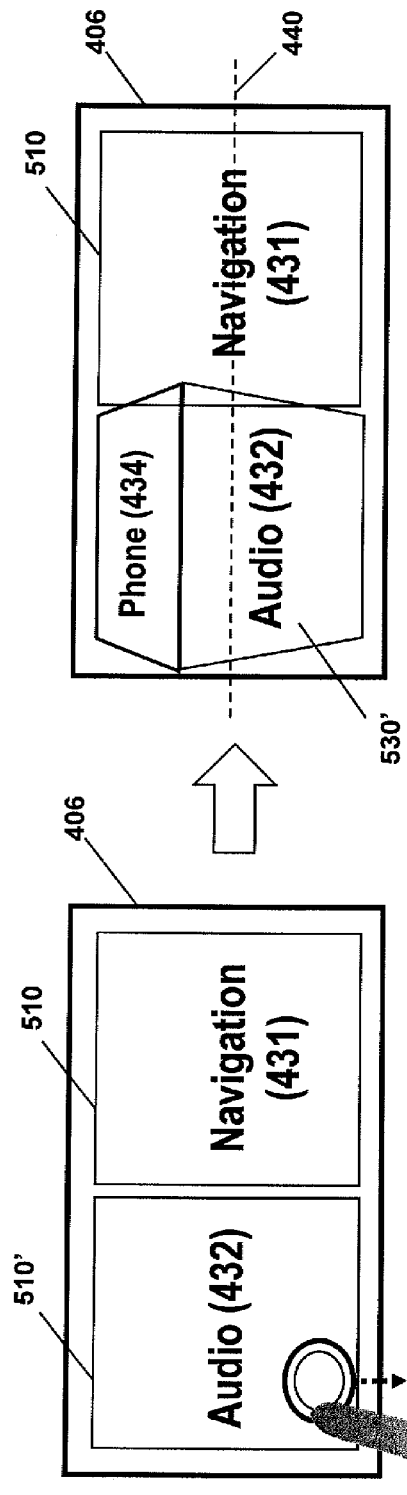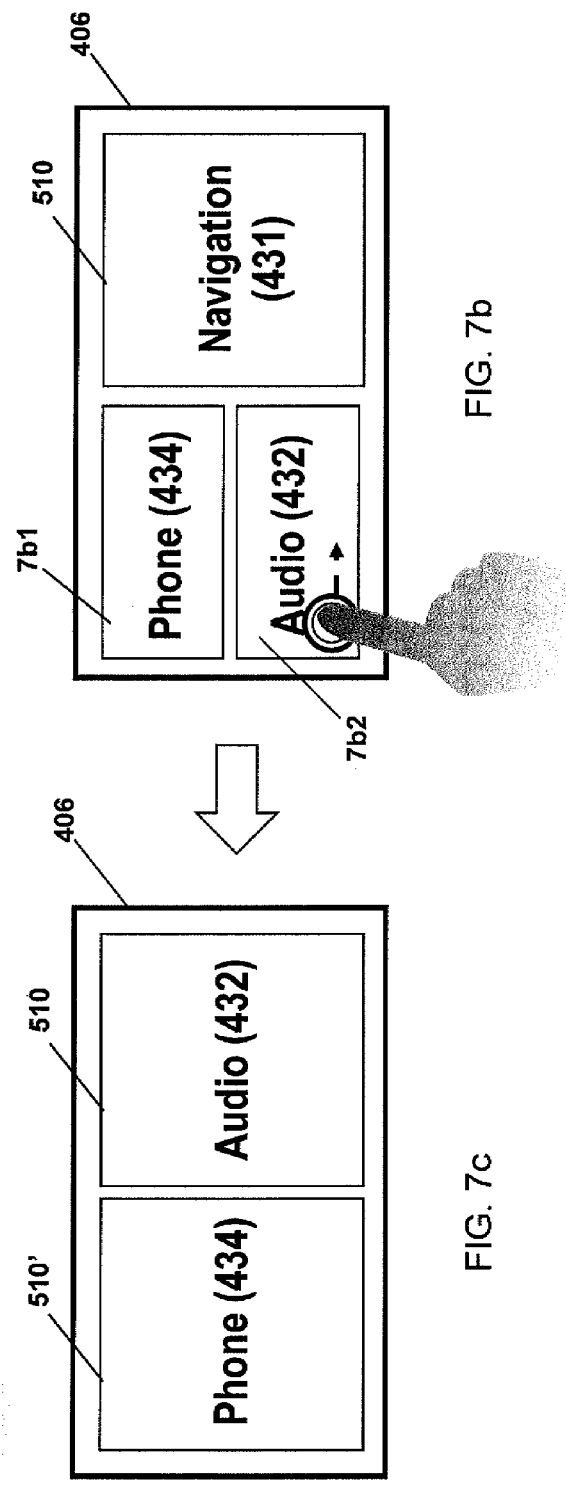

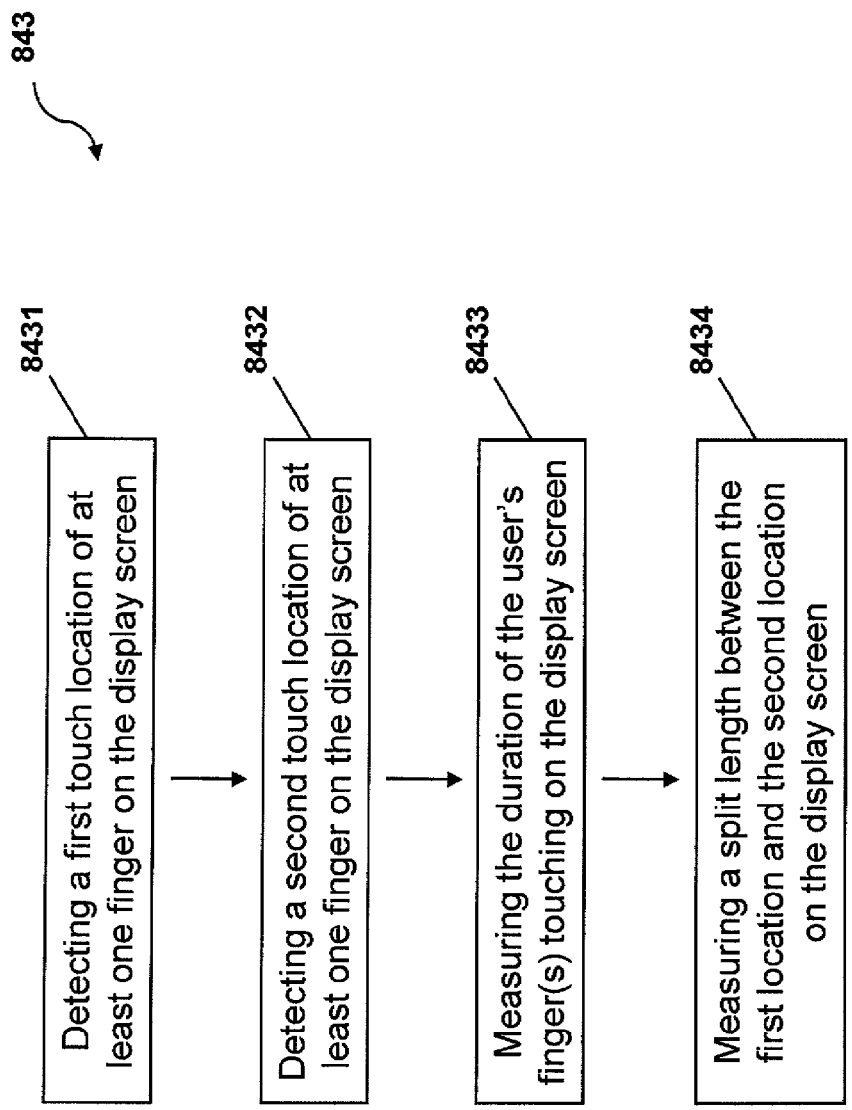

METHOD AND APPARATUS FOR CONTROLLING AND DISPLAYING CONTENTS IN A USER INTERFACE

FIELD OF THE INVENTION

This invention relates to a display method and apparatus, and more particularly, this invention relates to a user interface with multiple applications which can be operated concurrently and/or independently by using simple finger gestures.

BACKGROUND OF THE INVENTION

With remarkable advances in computer technologies, the interface between a user and most computers has been transformed from a text-based interface to a graphical user interface (GUI). The GUI provides graphical icons or entities which allow the user to interact with computers, electronic devices, such as media players, gaming devices, and navigation systems, etc., such that almost every user can intuitively operate graphically interfaced devices without further knowledge or training in computer technologies.

Currently, some user interfaces of the electronic devices or systems require the user to go through a large number of menus to obtain desirable results, which may be time consuming, inflexible and counterintuitive. Furthermore, the limitation of the user interface may also constrain the electronic devices to provide increased functionality.

U.S. Pat. App. Pub. No. 2006/0066507 discloses a display apparatus that is capable of displaying a composite image of a plurality of contents on a display screen such that, when the display screen of a display unit is viewed from different viewing positions with different viewing angles with respect to a direction normal to the display screen, an image of each of the different contents corresponding to the respective viewing positions can be viewed on a viewing screen from the corresponding viewing position. Even though such a "dual view" display method is capable of displaying multiple contents on a display screen, the user cannot see different contents simultaneously at one viewing angle.

U.S. Pat. No. 6,636,246 to Gallo et al. discloses a method and system of providing a three dimensional spatial user interface (SUI) to a user of a computing device. The SUI may contain a plurality of portals arranged in a three dimensional graphical representation for display to a user. Each portal may include a sensory cue adapted to display content therein. However, Gallo does not teach anything associated with displaying more than one contents simultaneously in each sensory cue by dividing the sensory cue into more than one portions. Gallo also does not disclose an idea of using a fingertip gesture to split the sensory cue.

U.S. Pat. No. 6,880,132 to Uemura discloses an information processing apparatus and method, and a program in which when various files or contents are listed and displayed, a three-dimensional body is provided to improve operability. In one embodiment, the information processing apparatus comprises means for forming at least a part of a three-dimensional body by a plurality of panels having attached thereto images, corresponding to a plurality of files or folders, the plurality of panels are arranged so as to form a side of a polygonal column, and displayed rotatably around a center axis of the polygonal column. Uemura, however, does not disclose anything related to displaying more than one contents simultaneously in each panel by dividing the sensory cue into more than one portions. Uemura also does not disclose the idea of using a fingertip gesture to split the panel.

Therefore, there remains a need for a new and improved display apparatus and method of displaying multiple applications in a display screen, and the user can view multiple applications simultaneously and move the applications around on the display screen by using simple finger gestures.

SUMMARY OF THE INVENTION

It is an object of the present invention to provide a user interface which allows a user to intuitively operate and control digital information, functions, applications, etc. to improve operability.

It is another object of the present invention to allow the user to view multiple applications simultaneously by controlling the user interface with simple finger gestures.

It is still another object of the present invention to allow the user to navigate the user interface via a "virtual spindle metaphor," in which the virtual workspace may extend beyond the physical user interface and each function, application, service, etc. can reside in a spindle style rotary configuration.

It is a further object of the present invention to reduce driver distraction when the display screen can be split and each application can be moved around. By configuring in such a way, the passenger can operate the navigation system while the user is driving.

The present invention relates to a display method and apparatus, and more particularly, this invention relates to an intuitive and flexible user interface for infotainment devices. The display apparatus may include a display screen to display at least one application thereon; a location detecting unit; a gesture interpreting unit; and an application managing unit, in which the location detecting unit is configured to detect at least one finger from a starting point to an ending point on the display screen, the gesture interpreting unit, which is communicatively coupled with the location detecting unit, is configured to recognize and interpret the user's finger gesture on the display screen, and if the user's finger gesture is interpreted to split the display screen to at least two display segments, the application managing unit is programmed to enable at least one application displayed on one display segment.

In one embodiment, the location detecting unit may include a location sensing unit to detect the location of the finger(s), and the gesture interpreting unit may include a length measuring unit to determine a split length between the starting and ending points of the finger(s) on the display screen and if the split length is longer than a predetermined length, the display screen may be split into at least two display segments.

In another embodiment, the display apparatus may also include a control unit, which is communicatively connected with the location detecting unit and the gesture interpreting unit and adapted to control the entire screen splitting and displaying process. Furthermore, the application managing unit may comprise a video generating unit which is configured to receive a command from the control unit to generate corresponding video image according to the user's finger gesture.

In another aspect, the present invention provides a display method comprising the steps of generating a polygonal column including a plurality of polygonal units; associating an application with each of the polygonal units; displaying each application in the polygonal unit on a display screen; and arranging the display screen to simultaneously display at least two applications, in which the display screen is controlled by a user's finger gesture to split into at least two display segments to display at least two applications.

In the method of the present invention, the step of displaying each application in the polygonal unit on a display screen may include the step of grouping the plurality of applications hierarchically, such that the applications grouped in the same hierarchy can be simultaneously displayed.

In the method of the present invention, the step of displaying each application in the polygonal unit on the display screen includes the step of searching for a specific application in the polygonal unit, which may further include a step of spinning the polygonal unit around a central axis on the display screen.

In the method of the present invention, the display method may further include a step of using the finger gesture to execute a specific application. In one embodiment, the user may tap on the specific application twice to execute it. In another embodiment, the user may press the specific application for a predetermined period of time to execute it. Furthermore, the executed application may include one or more sub-applications in a different hierarchy which are simultaneously displayed in another polygonal column.

In the method of the present invention, the step of arranging the display screen to simultaneously display at least two applications includes the steps of detecting a first location of at least one finger on the user interface; detecting a second location of the finger on the user interface; calculating a split length between the first location and the second location of the finger; determining whether the split length is sufficient to split the user interface; and splitting the user interface into at least two display segments to display at least two different applications.

In the method of the present invention, the step of determining whether the length is sufficient to split the display unit includes the step of determining whether the split length is greater than a predetermined reference length.

In one embodiment, each application in the display segment may also be displayed in the form of the polygonal column, and the user is allowed to spin each column to search for desirable applications. In addition, the applications simultaneously displayed on different display segments can be in the same or different group of hierarchy.

In a further embodiment, the display method in the present invention may further comprise a step of moving the application in each display segment to a desirable position. For example, some navigation systems can prevent the driver from operating the systems by detecting the incoming direction of the finger, and the passenger is usually allowed to perform such operation. By utilizing the present invention, the driver can simply move the navigation display segment to the passenger side, and not only can the navigation be operated, but the driver distraction is significantly reduced.

The present invention together with the above and other advantages may best be understood from the following detailed description of the embodiments of the invention illustrated in the drawings below.

BRIEF DESCRIPTION OF THE DRAWINGS

FIGS. 4d and 4e illustrate another example according to the embodiment in FIG. 4, in which the user uses one finger to drag down the spindle to search for a desirable application.

FIGS. 4f and 4g illustrate a further example according to the embodiment in FIG. 4, in which the user is allowed to view the contents of one application, and the contents are also arranged in a spindle form.

FIGS. 5, 5a and 5b illustrate a further embodiment of the present invention in which the user is allowed to split the display screen to two display segments by using a dragging-down gesture with two fingers.

FIGS. 5c and 5d depict another embodiment in which the user is allowed to select different applications in one of the display segments.

FIGS. 5e and 5f depict another embodiment in which the applications in different display segments can be swapped by the user's finger gesture.

FIGS. 6, 6a to 6c illustrate another embodiment in the present invention in which the user is allowed to close one application by the user's finger gesture.

FIGS. 7, 7a to 7c illustrate a further embodiment in the present invention in which the user is allowed to further split the display segment and close one of the applications by the user's finger gesture.

FIGS. 8, 8a and 8b illustrate another aspect of the present invention, depicting a display method for controlling and displaying contents on a user interface.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a display method and apparatus, and more particularly, this invention relates to a user interface with multiple applications which can be operated concurrently and/or independently by using simple finger gestures. Furthermore, the user is allowed to intuitively operate and control digital information, functions, applications, etc. to improve operability. In one exemplary embodiment of the present invention, the user is able to use finger gesture to navigate the user interface via a "virtual spindle metaphor" to select different applications. The user can also split the user interface to at least two display segments which may contain different applications. Moreover, each display segment can be moved to a desirable location on the user interface to provide a user-friendly operating environment without using any menu.

Figure 1:
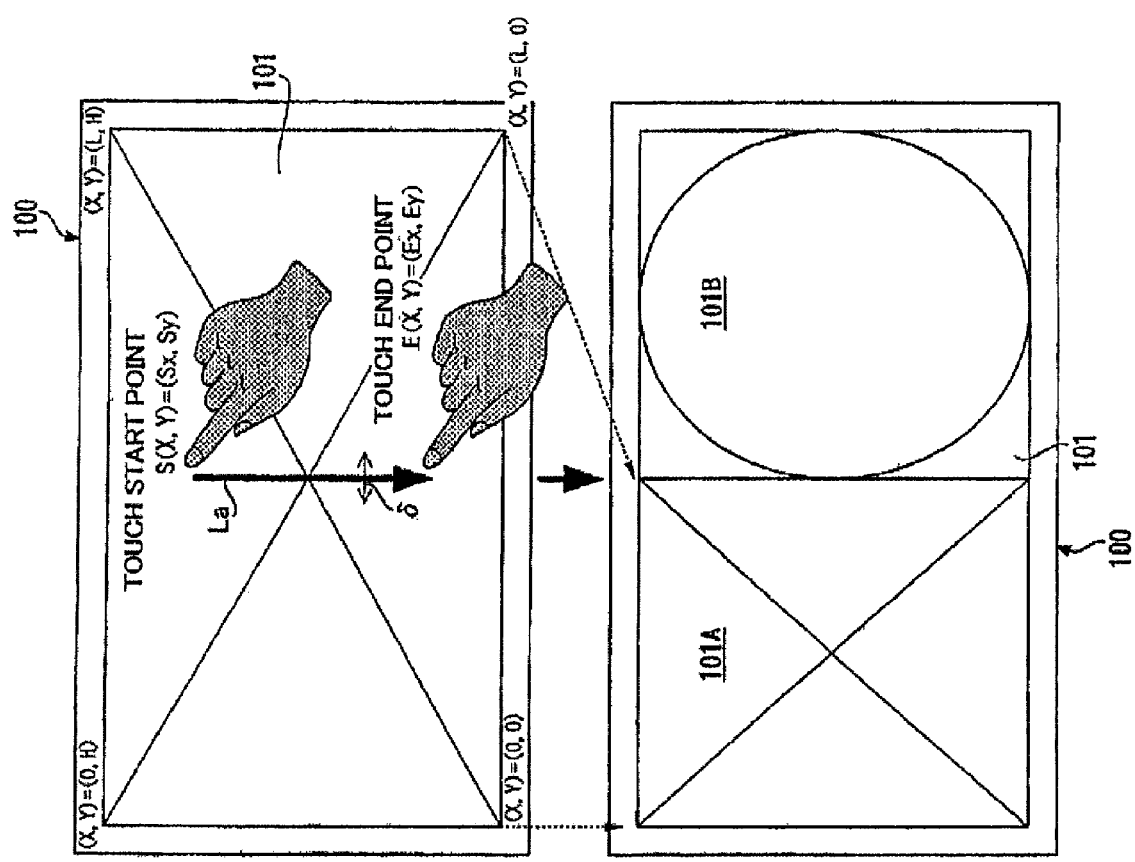
FIG. 1 illustrates a prior art, related to a display apparatus that is capable of displaying a composite image of a plurality of contents on a display screen, and the user is able to view different contents from different viewing positions or angles.
Figure 2:
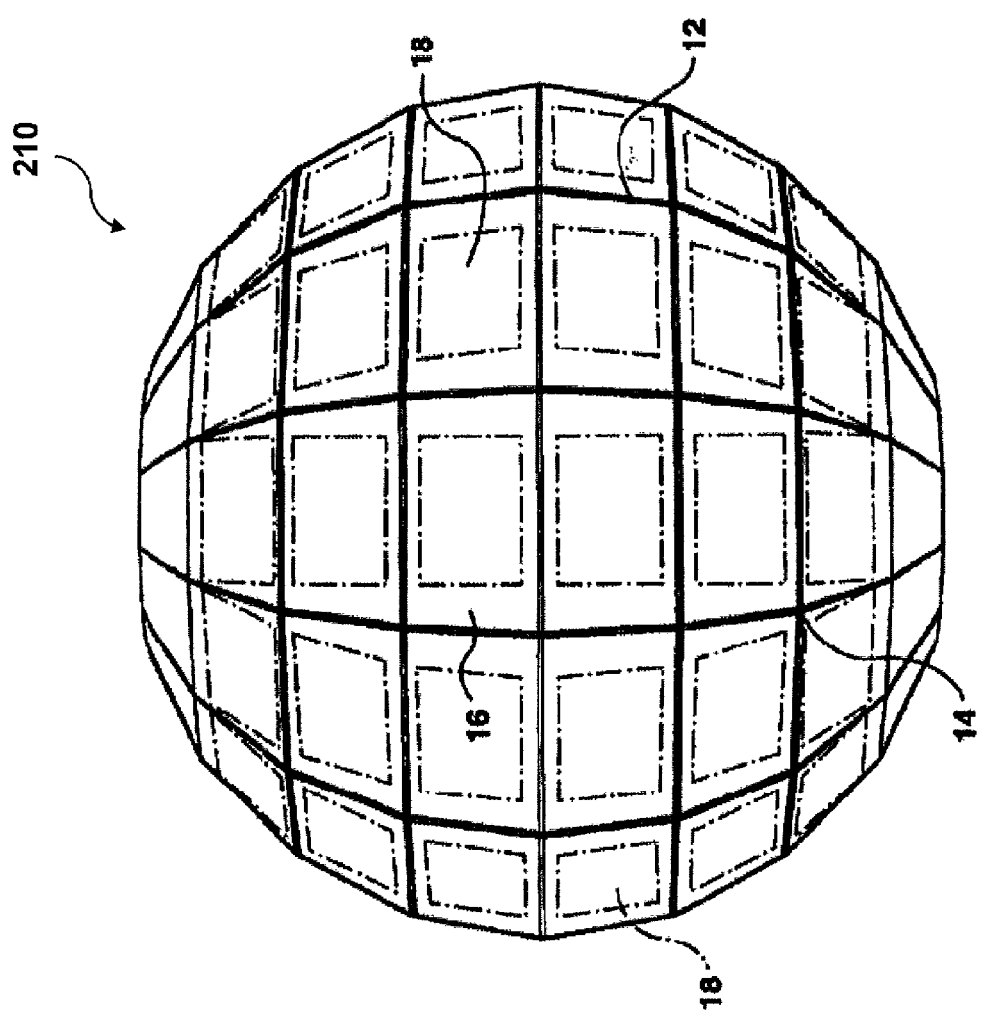
FIG. 2 illustrates a prior art, related to a method and system of providing a three dimensional spatial user interface (SUI) to a user of a computing device.
Figure 3:
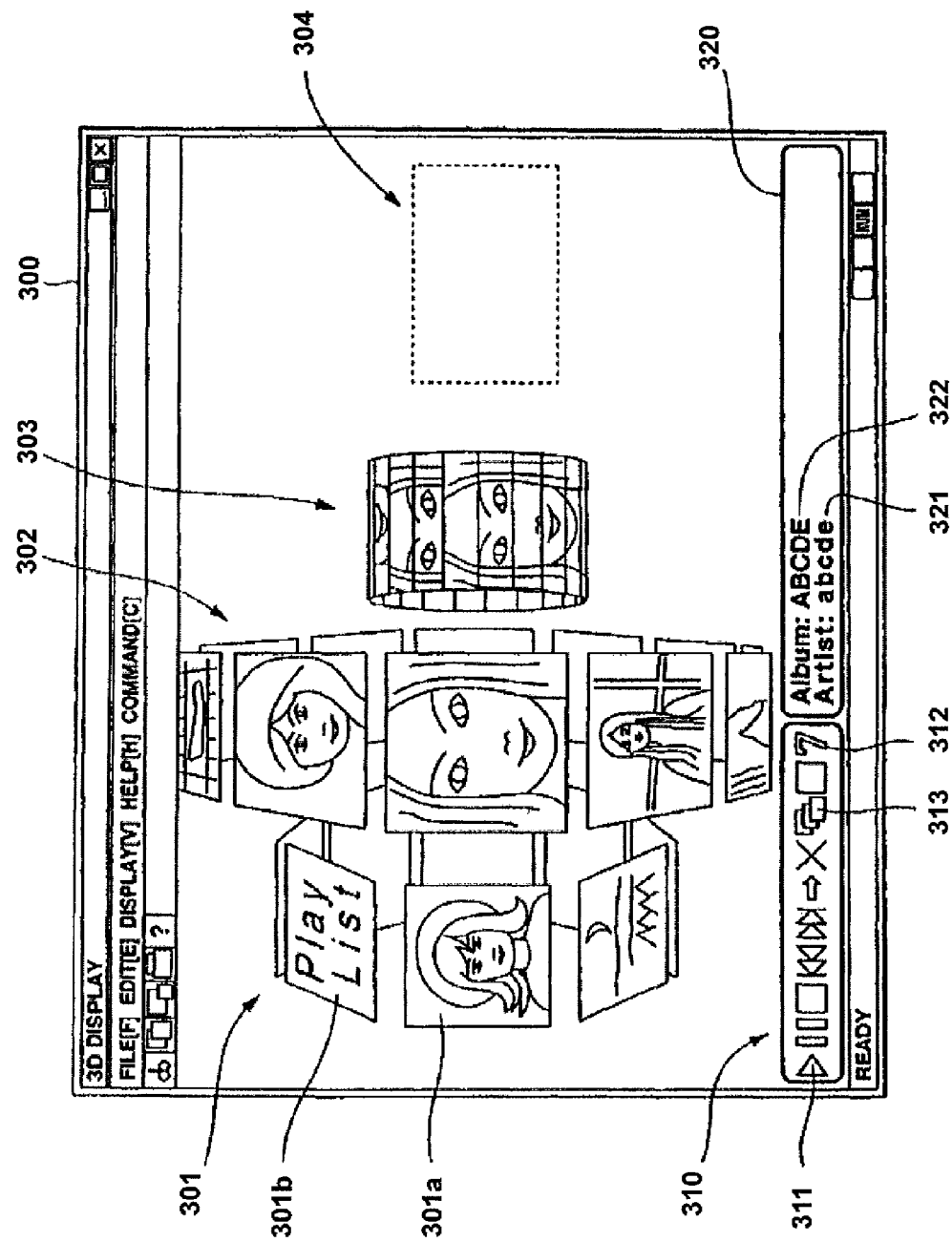
FIG. 3 illustrates an information processing apparatus and method, and a program in which when various files or contents are listed and displayed, a three-dimensional body is provided to improve operability.
Figure 4:
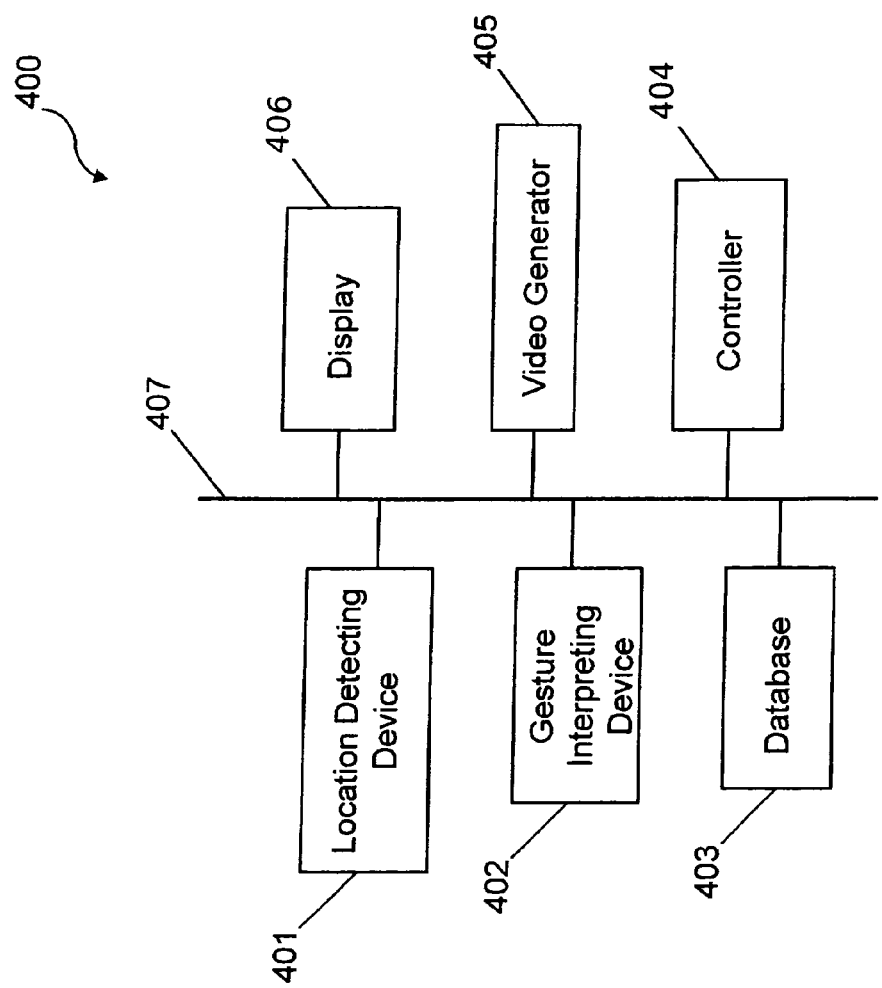
FIG. 4 illustrates a functional structure of a user interface for implementing the display method in the present invention.

FIG. 4 illustrates a functional structure of a user interface 400 for implementing the display method in the present invention, which may include a location detecting device 401, a gesture interpreting device 402, a database 403, a controller 404, a video generator 405, a display unit 406 and a bus 407. The location detection device 401, which may include one or more touch sensors, is adapted to detect the location of the user's finger on the display unit 406. A gesture interpreting device 402, which is communicatively coupled with the location detecting device 401, is configured to interpret the user's finger gesture on the display unit 406. Sometimes, it may be difficult to interpret or recognize the user's finger gesture, the gesture interpreting device 402 may also include one or more length calculating units and direction determining units to determine the length and direction of the user's finger gesture. In one embodiment, the length drawn by the user has to be greater than a predetermined length to split a screen or move applications in the present invention.

The controller 404 is adapted to receive the information provided by the location detection device 401 and the gesture interpreting device 402, analyze such information and control the overall screen splitting or application moving operation. The video generator 405 is configured to generate video data shown on the display unit 406 according to the results provided by the controller 404. The database 403 stores information such as application panels and contents therein.

Figure 4A:
FIG. 4a illustrates one embodiment in the present invention to, depict finger gestures and corresponding actions in the present invention.

FIG. 4a illustrates a table 408 which depicts finger gestures and corresponding actions in the present invention. The finger gestures and corresponding actions are not limited in the table 408, but may have other variations. In one implementation, the table 408 can be integrated into the gesture interpreting device 402 to analyze the user's finger gesture. In another embodiment, the user can design the table 408 according to his or her preference.

Figure 4C:
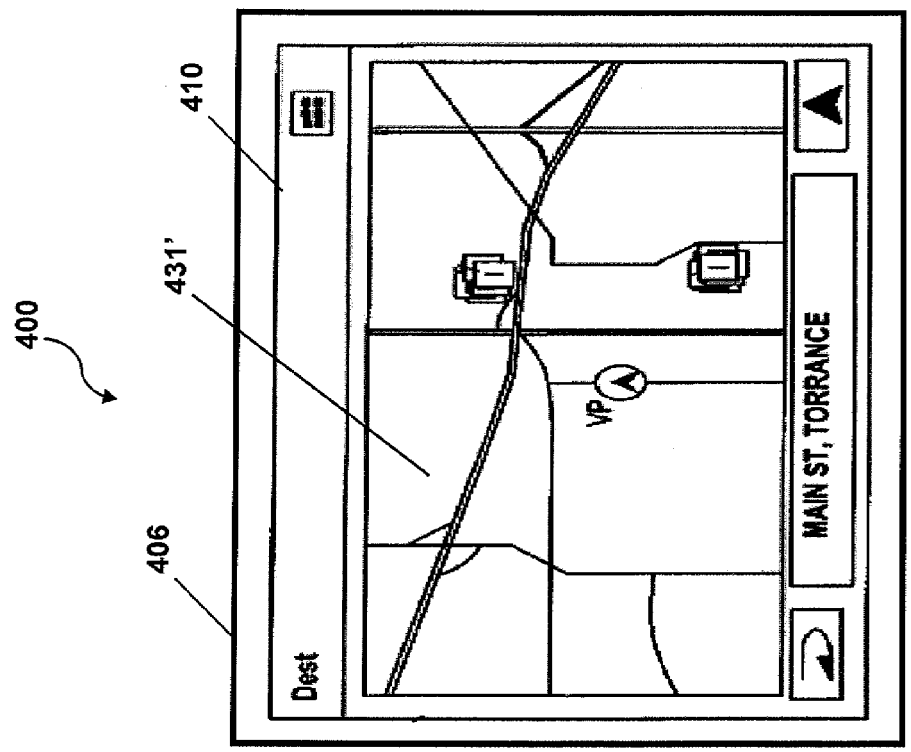
FIGS. 4b and 4c illustrate one example according to the embodiment in FIG. 4, in which the user executes a specific application by tapping the application twice or pressing the application for a predetermined period of time.
Figure 4B:
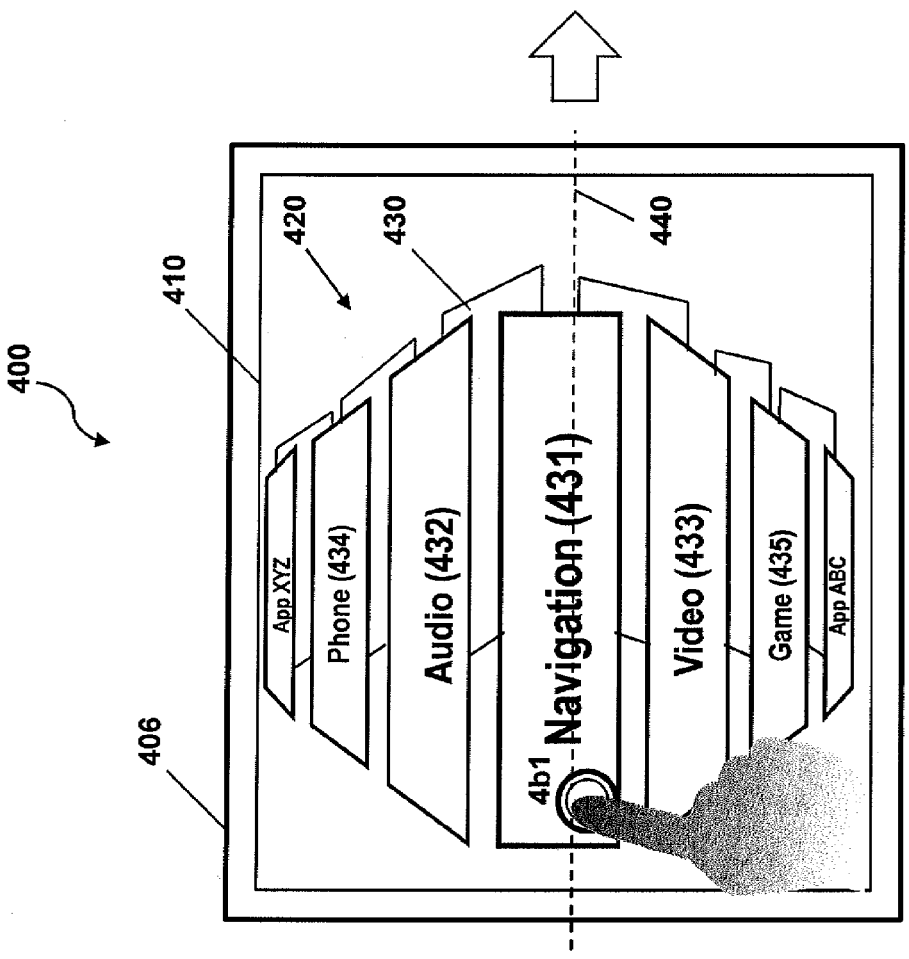

FIGS. 4b to 4g illustrate a number of examples in more detail according to one embodiment of the present invention. The user interface 400 may comprise the display unit 406 comprising a screen 410, and an application assembly 420 which includes a plurality of applications. As can be seen in FIG. 4b, the applications in the application assembly 420 may be arranged in a spindle form 430 which may include a plurality of application panels such as Navigation 431, Audio 432, Video 433, Phone 434, Game 435, etc. Furthermore, in order to provide a friendly user interface, the font of each application panel may change according to the location of each application, namely, the font of each application panel may increase when the application panel is moving closer to a center line 440. For example, the font in the Navigation panel 431, which is the closest panel to the center line 440, is larger than the fonts in the Audio panel 432, Video panel 433, Phone panel 434 and the Game panel 435.

The screen 410 may be a touch screen or multi-touch device to allow a user to execute each application by either pressing the corresponding application panel for a predetermined period of time or tapping twice on the corresponding application panel. For example, as shown in FIGS. 4, 4b and 4c, the location detecting device 401 detects the location of the user's finger (4b1) on the screen 410 and if the user wants to execute the application, e.g. Navigation 431, by further pressing the Navigation panel 431 or tapping it twice, the gesture interpreting device 402 is adapted to recognize the finger gesture and transmit such information to the controller 404 through the bus 407. The controller 404, which is configured to control the overall operation of performing the display method in the present invention, sends a command to the video generator 405 and the display unit 406 to show the navigation screen 431' with a map and the vehicle's current position. In another embodiment, the application can be executed by a rotary mechanical dial.

Furthermore, the user can select different applications in the spindle 430 by spinning it around the center line 440. For example, as can be seen in FIGS. 4d and 4e, if the Navigation panel 431 is at the middle of the screen 410 and user wants to view the contents in the Audio panel 432 which is just above the Navigation panel 431, the user can use one finger to slightly drag down or spin the spindle 430 so that the Audio panel 432 will be shown in the middle of the screen 410 for the user to operate. Similarly, the user can view the contents in the Audio panel 432 by tapping it twice on the screen 410. As depicted in FIGS. 4f and 4g, the contents in the Audio panel 432 can also be shown in a sub-application assembly 420' which is also in a spindle form 430', including applications such as iPod 450, FM Radio 451, AM Radio 452, CD 453, Satellite Radio 454, Audio setting 455, etc. The user can take the same action when the user is interested in viewing the contents in the sub-application assembly 420'. For example, if the user wants to listen to some music from a CD player, the user can tap the CD panel 453 twice to see music titles in a CD and again tap twice on the specific music title to listen. Likewise, the user can view the contents in the Video panel 433, the Phone panel 434 and the Game panel 435. In some embodiments, the spindles 430 and 430' can be spun faster if the user applies more force to drag down the spindles 430 and 430'.

In another embodiment shown in FIGS. 5, 5a and 5b, if the user wishes to have a "dual view" on the screen 410, the user may be allowed to split the screen 410 into at least two display segments (530, 530') by using the "two finger dragging down" gesture exemplified in the table 408 in FIG. 4a. As described above, the location detecting device 401 detects the location of the user's fingers (501, 502) and the gesture interpreting device 402 is adapted to interpret and recognize the user's gesture. In the current embodiment, the gesture interpreting device 402 may further include a touch sensor (not shown) to detect the number of the user's finger on the screen 410. Once the touch sensor determines the number of the user's finger, such information is transmitted to the gesture interpreting device 402 to recognize the finger gesture, and the controller 404 starts and controls the screen splitting process. The screen 410 can be split when a smaller spindle 530' starts to spin by the two-finger gesture and the screen splitting process may stop when one of the application panels (e.g. Audio 432) is mainly shown on one side of the screen 510'.

Similar to the spindle 430, the smaller spindle 530' includes a plurality of application panels and if the user wants to view other application panels on the smaller spindle 530' while using the Navigation 431, the user can simply use one finger to spin the smaller spindle 530' at the lower corner of the left side of the screen 510' until a desirable application is found, as shown in FIGS. 5c and 5d. The user can also view the content of each application panel in the smaller spindle 530' by either pressing or tapping twice on the corresponding application panel, as previously shown in FIGS. 4d and 4e.

In some vehicle navigation systems, the driver is prohibited from operating the navigation system while driving to avoid driver distraction. It may be inconvenient for the driver if operating the navigation system is necessary to search or reroute. This problem can be solved if the passenger in the vehicle can operate the navigation system when the driver is driving. As can be seen in FIGS. 5e and 5f, there are two screens 510 and 510' on the display unit 406, and the Navigation panel 431 is shown on the left screen 510' while the Audio panel 432 is shown on the right screen 510. Assuming that the driver is on the left side and being prohibited from operating the navigation system, the driver can simply swap the Navigation panel 431 to the passenger side on the right, such that the navigation system can still be operated while the driver is driving.

More specifically, in the current embodiment, the location detecting device 401 can detect the location of the user's finger(s) for example, at a touching point 5c1 on the screen 510' and another touching point 5c2 on the screen 510. When the user slightly rotates the fingers as if simultaneously moving the touching point 5c1 to the screen 510 and the touching point 5c2 to the screen 510', the gesture interpreting device 402 can recognize the user's finger gesture and transmit such information to the controller 404 which may control the entire screen swapping process. As described above, a command may be sent from the controller 404 to the video generator 405 to swap the screens 510 and 510' on the display unit 406.

In another embodiment, the user can use simple finger gesture to close an unwanted application. Referring to FIGS. 6 and 6a, the user can spin the smaller spindle 530' to select a different application by dragging down the screen 510' with one finger, as previously shown in FIGS. 5c and 5d. As can be seen in FIG. 6b, two applications, Phone 434 and Navigation 431, are located on the display segments 510' and 510, respectively. If the user wishes to close the Navigation 431 application, the user can simply slide the Phone 434 application on the display segment 510' to the Navigation 431 on the display segment 510, and the two display segments 510' and 510 will be merged to the screen 410 with the Phone 434 application thereon, as shown in FIG. 6c. On the other hand, if the user wants to keep the Navigation application 431 and get rid of the Phone application 434, the user can slide the Navigation application 431 to the left side where the Phone application 434 is located.

Likewise, the location detecting device 401 is adapted to detect the user's finger locations 601 and 6b1, and the gesture interpreting device 402 is configured to interpret different finger gestures shown in FIGS. 6 and 6b, the former is to spin the spindle and the latter is to close an unwanted application. Upon receiving different gesture information from the gesture interpreting device 402, the controller 404 is adapted to send different commands to the video generator 405 and the display unit 406 to generate different images, responding to the user's finger gestures.

Referring to FIGS. 7, 7a and 7b, when two applications are shown simultaneously at the display segments 510 and 510', the display segment can be further split to multiple display portions. For example, as shown in FIG. 7a when the user drags the Audio panel 432 down and stops when the Phone panel 434 is close to the center line 440, the display segment 510' can be further split to two display portions 7b1 and 7b2, which contain the applications of Phone 434 and Audio 432, respectively. In one embodiment, if the Phone panel 434 is being dragged over the center line 440, the Audio panel 432 may be replaced by the Phone panel 434. As can be seen in FIG. 7b, the display unit 406 includes three applications, Navigation 431 on the display segment 510 on the right side, and Audio 432 and Phone 434 on the two display portions 7b1 and 7b2 on the left side. If the user decides to close the Navigation panel 431 on the display segment 510 and moves the Audio panel 432 thereto, the user can simply slide the Audio panel 432 to the display segment 510 where the Navigation panel 431 is located, in which the Audio panel 432 will replace the Navigation panel 431 on the display segment 510, as shown in FIG. 7c.

Figure 8:
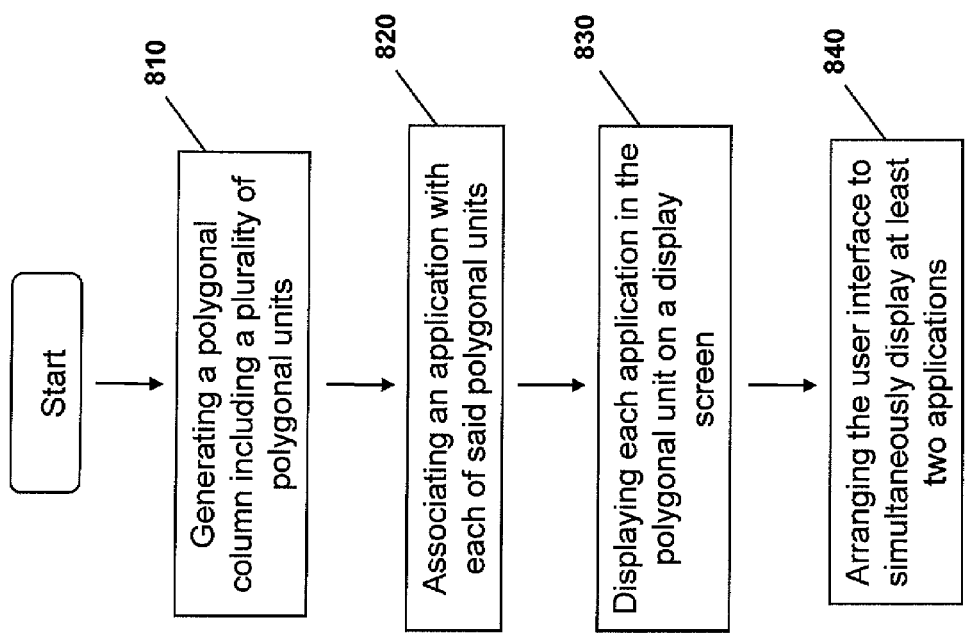

According to another aspect illustrated in FIG. 8, a display method includes the steps of generating a polygonal column including a plurality of polygonal units 810; associating an application with each of the polygonal units 820; displaying each application in the polygonal unit on a display screen 830; and arranging the user interface to simultaneously display at least two applications 840, in which the display screen is controlled by a user's finger gesture to split into at least two display segments to display at least two applications.

In step 810, the polygonal column and units can be generated by the video generator 405 according to the information stored in the database 403. Likewise, the information of each application can also be stored in the database 403. In one embodiment; the step of displaying each application in the polygonal unit on a display screen 830 may include the step of grouping the plurality of applications hierarchically, such that the applications grouped in the same hierarchy can be simultaneously displayed. In another embodiment, the step of displaying each application in the polygonal unit on a display screen 830 may also include the step of searching for a specific application in the polygonal unit, which may further include a step of spinning the polygonal column around a central axis on the display screen 410.

Figure 8A:
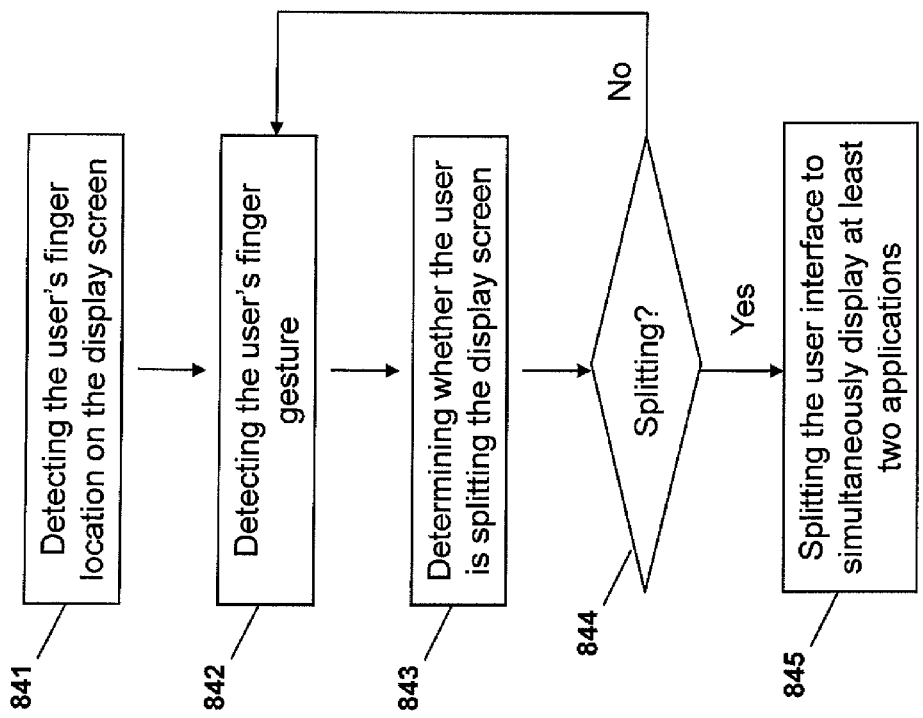

Referring to FIG. 8a, the step of arranging the display screen to simultaneously display at least two applications 840 includes the steps of detecting the user's finger location on the display screen 841; detecting the user's finger gesture 842; determining whether the user is splitting the display screen 843; and splitting the display screen into at least two display segments to display at least two different applications if the user's gesture is recognized to split the display screen 845. In step 844, if the user's finger gesture is not recognized to split the screen, the finger gesture may be again interpreted or recognized in step 842.

In one embodiment, the location detecting device 401 is adapted to detect the user's finger location on the display screen in step 841, while the gesture interpreting device 402 is used to interpret the user's finger gesture in step 842. If the user's finger gesture is interpreted to split the display screen, the controller 404 and the video generator 405, as described above, are configured to split the display screen to simultaneously display at least two applications on the display unit 406, as shown in step 845.

The step of determining whether the user is splitting the display screen 843 may include the steps of detecting a first touch location of at least one finger on the display screen 8431, detecting a second touch location of at least one finger on the display screen 8432, measuring the duration of the user's finger(s) touching on the display screen 8433, and measuring a split length between the first location and the second location on the display screen 8434. The location detecting device 401 may be used to detect the location of the user's finger(s) in steps 8431 and 8432. The gesture interpreting device 402 may further include a time measuring unit (not shown) and a length measuring unit (not shown) to measure the touch duration of the user's finger(s) and the length between the first and the second touch locations on the display screen. The controller 404 is configured to determine whether the user's finger gesture indicates to split the screen, according to the information collected in steps 8431 to 8434.

Figure 9:
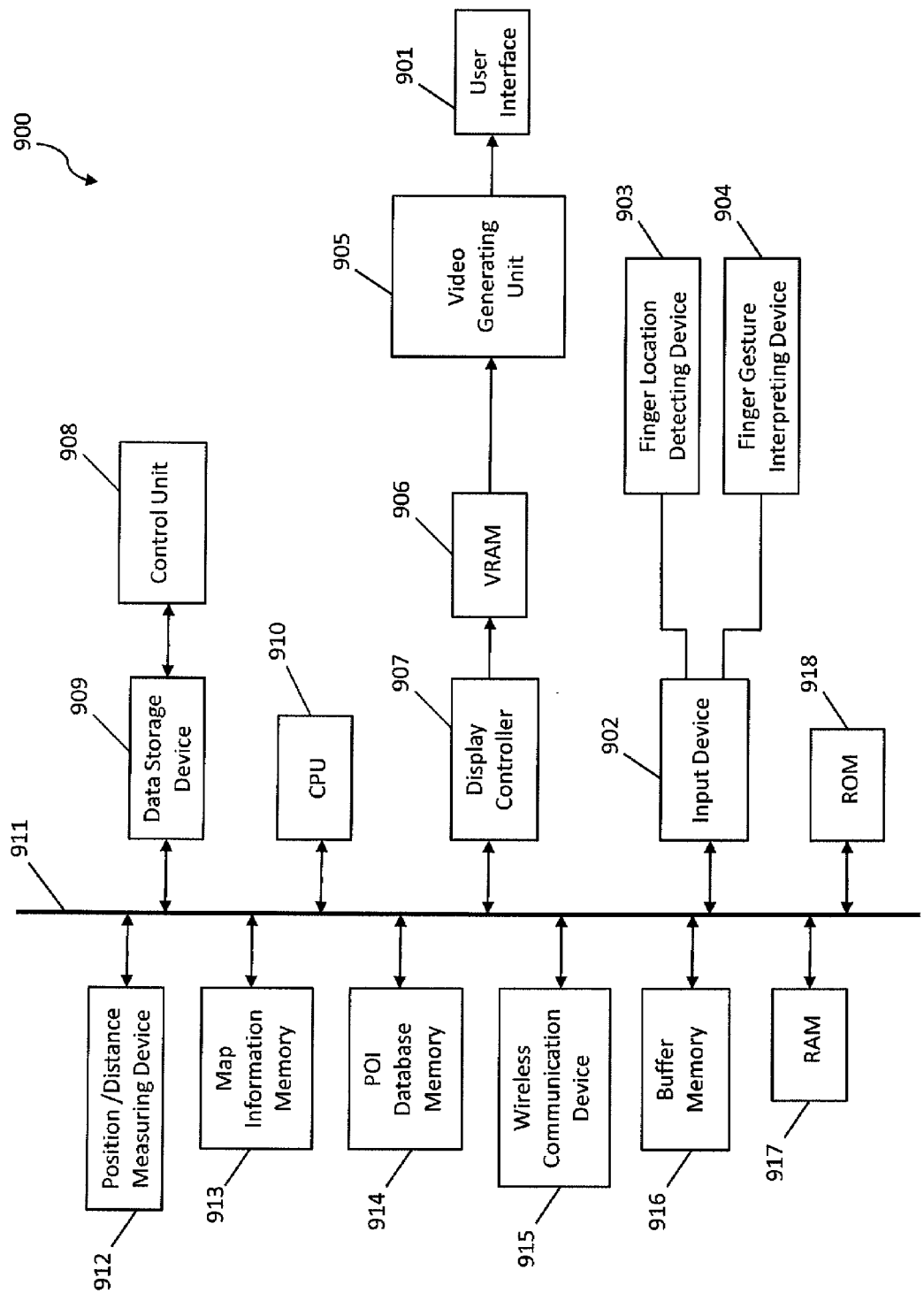
FIG. 9 illustrates a functional block diagram showing an example of structure of a navigation system implementing the method and apparatus for controlling and displaying contents on a user interface.

FIG. 9 is a block diagram showing an example of structure of a navigation system 900 for implementing the present invention in another aspect. The navigation system 900 includes a user interface 901, an input device 902 which includes a finger location detecting device 903 and a finger gesture interpreting device 904, a video generating unit 905, a VRAM 906 and a display controller 907. The finger location detecting device 903 and the finger gesture interpreting device 904, like the location detecting device 401 and the gesture interpreting device 402 in FIG. 4, are adapted to provide information to the display controller 907 to determine the meaning of the user's finger gestures, and further manage the entire image display process.

The VRAM 906 is used for storing images generated by the display controller 907, and the video generating unit 905, like the video generator 405 in FIG. 4, is configured to receive commands from the display controller 907 to generate different video images according to the user's finger gestures. All embodiments and examples described above in FIGS. 4, 4a to 4g, 5, 5a to 5f, 6, 6a to 6c, 7, 7a to 7c can also be applied in the navigation system 900.

The system also includes a data storage device 909 such as a hard disc, CD-ROM, DVD or other storage means for storing the map data; a control unit 908 for controlling an operation for reading the information from the data storage device 909; and a position and distance measuring device 912 for measuring the present vehicle position or user position. For example, the position and distance measuring device 912 has a speed sensor for detecting a moving distance, a gyroscope for detecting a moving direction, a microprocessor for calculating a position, a GPS (global positioning system) receiver for receiving GPS signals from satellites for calculating a current position of the user. In one embodiment, the input device 902 is communicatively coupled with the position and distance measuring device 912, the display controller 907, the video generator 905 and the user interface 901 to display a map with the vehicle's current position if the user's finger gesture indicates so. For example, as previously shown in FIGS. 4b and 4c, the user's finger gesture (tapping on the Navigation panel 431 twice) indicates that the user may need to view the navigation screen 431'.

The block diagram of FIG. 9 further includes a map information memory 913 for storing the map information which is read from data storage 909, a database memory 914 for storing database information such a point of interest (POI) information which is read out from the data storage device 909. Still referring to FIG. 9, the navigation system 900 includes a bus 911 for interfacing the above units in the system, a processor (CPU) 910 for controlling an overall operation of the navigation system 900, a ROM 918 for storing various control programs such as a route search program and a map matching program necessary for navigation control, a RAM 917 for storing a processing result such as a guide route and an event notification, a wireless communication device 915 to retrieve data from a remote server, the Internet or other communication networks, and a buffer memory 916 for temporary storing data for ease of data processing.

The invention claimed is:

1. A user interface, comprising:
   a controller for controlling an overall operation of the interface unit, the controller being configured to associate an application with each of a plurality of polygonal units;
   a video generator operatively connected to the controller and configured to generate a polygonal column including said plurality of polygonal units;
   a display screen operatively connected to the controller and video generator unit and configured to display each application in the polygonal unit thereon and
   a gesture interpreting device operatively connected to the controller and configured to interpret a user's finger gesture on the display screen so as to display each application according to the user's finger gesture,
   wherein the display screen is controlled by the controller based on the user's finger gesture to display one application or split into at least two display segments to simultaneously display at least two different applications which can be operated concurrently and/or independently, and
   wherein the gesture interpreting device detects a user's finger location on the display screen, detects the user's finger gesture, determines whether the user is splitting the display screen, and splits the display screen into at least two display segments to display at least two different applications when the user's gesture is recognized to split the display screen by detecting a plurality of the user's fingers on the display screen.

2. The user interface of claim 1,
   wherein said controller is configured to group said applications hierarchically to display the applications in the same hierarchy simultaneously, wherein the application includes a source, a function, a music title and a medium title.

3. The user interface of claim 1, further comprising a location detecting device operatively connected to the controller and gesture interpreting device and configured to detect the user's finger location on the display screen,
   wherein the gesture interpreting device detects the user's finger gesture based on information from the location detecting device,
   wherein the controller determines whether the user is splitting the display screen based on information from the gesture interpreting device, and
   wherein the controller causes the display screen to split into at least two display segments to display at least two different applications if the user's gesture is recognized to split the display screen.

4. The user interface of claim 3,
   wherein when determining whether the user is splitting the display screen, the location detecting device detects a first touch location of at least one finger on the display screen, and a second touch location of at least one finger on the display screen,
   and wherein the gesture interpreting device measures a duration of the user's finger(s) touching on the display screen, and a split length between the first location and the second location on the display screen detected by the location detecting device.

5. The user interface of claim 4,
   wherein when measuring a split length between the first location and the second location on the display screen, the gesture interpreting device determines whether the split length is longer than a predetermined reference length and across a center line of the display screen, and wherein the controller causes the display screen to spilt if the split length is longer than the predetermined reference length and across the center line of the display screen.

6. The user interface of claim 3, wherein the controller causes the display screen to display at each application according to a user's finger gesture and to move at least one application to a desirable position on the display screen.

7. A display method comprising the following steps of:

generating a polygonal column including a plurality of polygonal units;

associating an application with each of said polygonal units;

displaying each application in the polygonal unit on a display screen; and arranging the user interface to display each application according to a user's finger gesture, wherein the display screen is controlled by the user's finger gesture to display one application or split into at least two display segments to simultaneously display at least two different applications which can be operated concurrently and/or independently, and wherein said step of arranging the user interface to display each application according to a user's gesture comprises steps of detecting a user's finger location on the display screen, detecting the user's finger gesture, determining whether the user is splitting the display screen, and splitting the display screen into at least two display segments to display at least two different applications when the user's gesture is recognized to split the display screen by detecting a plurality of the user's fingers on the display screen.

8. The display method of claim 7, wherein said step of displaying each application in the polygonal unit on a display screen comprises the step of grouping said applications hierarchically to display the applications in the same hierarchy simultaneously, wherein the application includes a source, a function, a music title and a medium title.

9. The display method of claim 8, wherein the display method further comprises the step of searching for a specific application by spinning the polygonal column.

10. The display method of claim 7, wherein said step of arranging the display screen to display each application according to a user's gesture comprises the steps of detecting the user's finger location on the display screen, detecting the user's finger gesture, determining whether the user is splitting the display screen, and splitting the display screen into at least two display segments to display at least two different applications if the user's gesture is recognized to split the display screen.

11. The display method of claim 10, wherein said step of determining whether the user is splitting the display screen comprises the steps of detecting a first touch location of at least one finger on the display screen, detecting a second touch location of at least one finger on the display screen, measuring the duration of the user's finger(s) touching on the display screen, and measuring a split length between the first location and the second location on the display screen.

12. The display method of claim 11, wherein said step of measuring a split length between the first location and the second location on the display screen comprises the step of determining whether the split length is longer than a predetermined reference length and across a center line of the display screen, wherein the screen is spilt if the split length is longer than the predetermined reference length and the across the center line of the display screen.

13. The display method of claim 10, wherein said step of arranging the display screen to display each application according to a user's finger gesture further comprises the step of moving at least one application to a desirable position on the display screen.

14. A display apparatus, comprising:

a display screen to display at least one application thereon, a location detecting unit configured to detect a location of at least one finger from a starting point to an ending point on the display screen;

a gesture interpreting unit communicatively coupled with the location detecting unit to recognize and interpret the user's finger gesture on the display screen; and an application managing unit, wherein if the user's finger gesture is interpreted to split the display screen to at least two display segments to simultaneously display at least two different applications which can be operated concurrently and/or independently, the application managing unit is programmed to enable at least one application displayed on one display segment, and wherein the gesture interpreting unit detects the user's finger location on the display screen, detects the user's finger gesture, determines whether the user is splitting the display screen, and the display screen splits the display screen into at least two display segments to display at least two different applications when the user's gesture is recognized to split the display screen by detecting a plurality of the user's fingers on the display screen.

15. The display apparatus of claim 14, wherein the gesture interpreting unit comprises a length measuring unit to determine a split length between the starting and ending points of the finger(s) on the display screen and if the split length is longer than a predetermined length, the display screen is split into at least two display segments.

16. The display apparatus of claim 14, further comprises a control unit, which is communicatively connected with the location detecting unit and the gesture interpreting unit and adapted to control the entire screen splitting and displaying process.

17. The display apparatus of claim 16, further comprises a video generating unit which is configured to receive a command from the control unit to generate corresponding video image according to the user's finger gesture.

18. The display apparatus of claim 17, wherein the display apparatus is communicatively coupled with a vehicle navigation system to display a route guidance and a vehicle's current location on either the display screen or the display segment.

19. The display apparatus of claim 18, wherein a vehicle driver is allowed to move the display segment displaying the route and the vehicle's current position on the display screen where a passenger is allowed to operate the navigation system.

* * * * *